June 15, 1926.
C. B. PARKER
COFFEEPOT
Filed Nov. 10, 1925
1,588,769
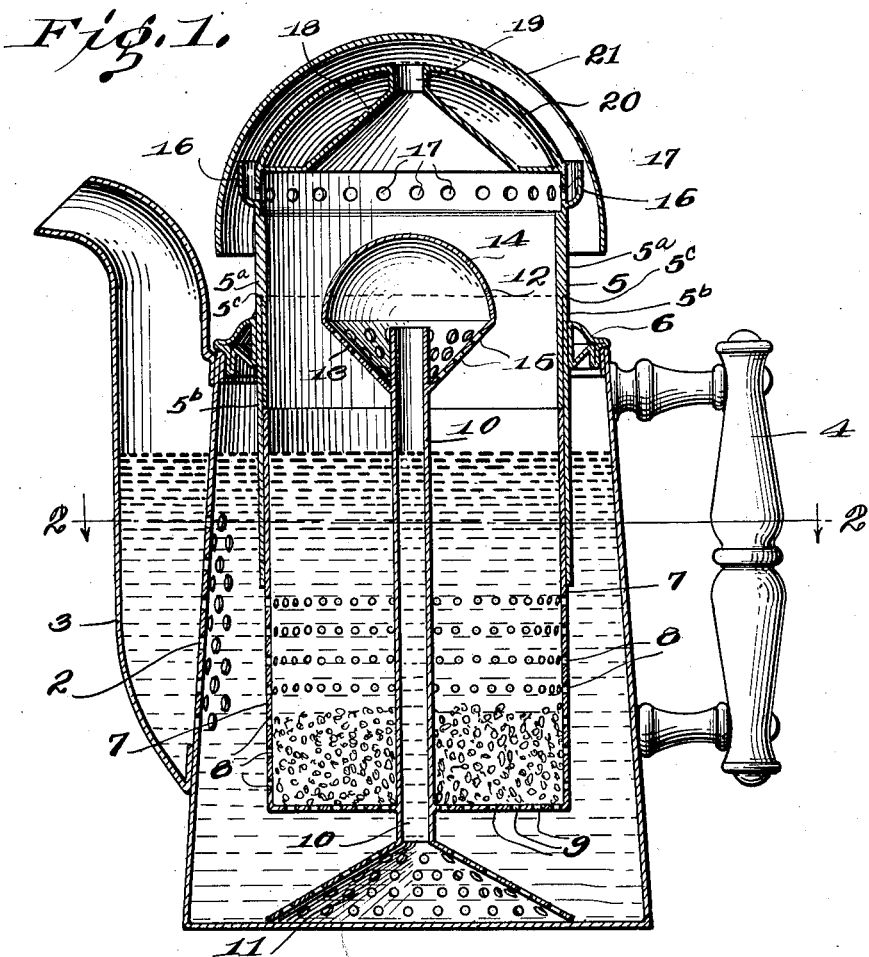
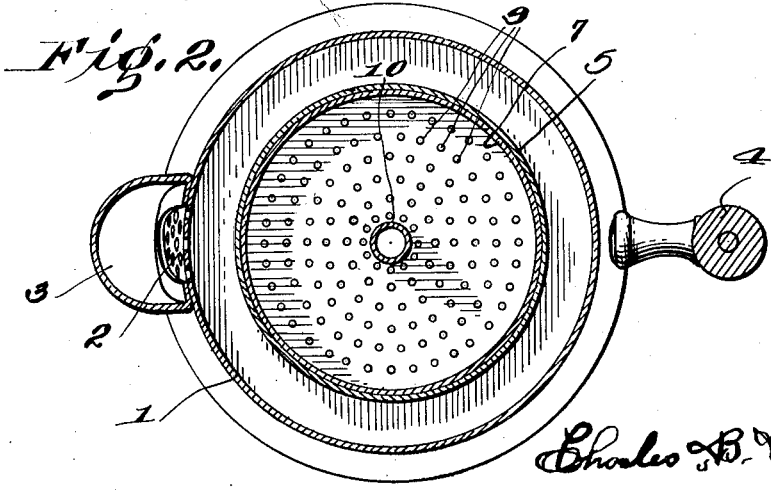
Inventor
Charles B. Parker Patented June 15, 1926.

1,588,769

UNITED STATES PATENT OFFICE.

CHARLES B. PARKER, OF NASHVILLE, TENNESSEE.

COFFEEPOT.

Application filed November 10, 1925. Serial No. 68,244.

This invention relates to coffee pots and more particularly to the percolator structure thereof and it consists in the novel features hereinafter described and claimed.

An object of the invention is to provide a coffee pot of simple structure and which may be used for extracting the essential properties from the coffee without scorching or burning the coffee grounds and thus avoiding the destruction of the taste of the liquid coffee which is made in the pot.

A further object of the invention is to provide in conjunction with the percolator structure means for separating the coffee extract from the moisture or steam by a distilling process and for returning the extract to the interior of the percolator and within the body of the coffee pot in order that it may be resubjected to the action of the heat.

In the accompanying drawings,

Figure 1 is a vertical sectional view of the coffee pot, and

Figure 2 is a horizontal sectional view cut on the line 2—2 of Figure 1.

The coffee pot structure comprises a body 1 having at its sides a series of openings 2 over which a spout 3 is disposed in a usual manner. The body 1 is provided at that side opposite the side at which the spout 3 is mounted with a handle 4.

The percolator structure comprises an outer cylinder 5 provided at its outer surface and along a line between its upper and lower ends with an outstanding flange 6 adapted to rest upon the upper edge of the body 1 when the percolator structure is applied and as best shown in Figure 1 of the drawings. The outer cylinder 5 is constructed of two sections 5ª and 5ᵇ, section 5ª being arranged above the outstanding flange 6 and being adapted to telescope within sections 5ᵇ at its lower end. Shoulders 5ᶜ are formed upon the two sections for engaging each other so as to properly support section 5ª upon section 5ᵇ. By constructing the cylinder 5 of two sections, the upper section 5ª may be disengaged from the lower section 5ᵇ, thus permitting the convenient handling and operating of the device. The percolator structure also includes an inner cylinder 7 which is provided at its lower portion with openings 8 and having in its bottom wall openings 9. The cylinder 7 is adapted to fit snugly in the lower portion of the cylinder 5 and the perforations 8 and 9 are disposed below the lower edge of the cylinder 5. A hollow column 10 passes centrally through the bottom wall of the cylinder 7 and is provided at its lower end with a perforated cone-shape base 11 adapted to rest upon the bottom wall of the body 1. A dome 12 is carried at the upper end of the column 10 and the said dome is provided with a lower cone-shaped wall 13 and an upper semi-globular wall 14. The wall 13 is provided with openings or perforations 15 and the upper end of the column 10 is disposed above the upper surface of the wall 13 and below the under surface of the wall 14. A trough 16 surrounds the upper end of the cylinder 5 and openings 17 pass through the cylinder 5 and communicate at one end with the interior thereof and at their outer ends with the interior of the trough 16 as best shown in Figure 1 of the drawings. An inverted funnel 18 is mounted upon the upper end of the cylinder 5 and is provided with a nipple 19 which passes through a convexed wall 20. The lower edge of the wall 20 is located below the upper edge of the trough 16 and is spaced therefrom. A convexed dome 21 is located above the wall 20 and is spaced therefrom, and the hood 21 extends over the trough 16 and the lower edge of the hood is spaced from the outer surface of the side of the cylinder 5.

In operation, the ground coffee is placed within the cylinder 7 and the cylinder 7 is inserted in the lower end of the cylinder 5. The body of the coffee pot is filled with water approximately to the level as indicated in Figure 1 of the drawings and then the cylinders 7 and 5 are inserted through the open top of the body 1 so that the flange 6 rests upon the upper edge of the body 1. The body 1 is then placed upon the stove (not shown). As the water boils it passes up through the column 10 and is ejected therefrom against the under surface of the wall 14 of the dome 12. The water and steam then passes down through the openings 15 in the wall 13 and the water descends into the cylinder 7 and passes down through the coffee grounds and absorbs the essence therefrom. From the dome 12 the steam rises and carries with it some of the coffee extract. The steam thus ladened with the extract passes through the funnel 18 and the nipple 19 and the steam which is ladened with the extract condenses against the under surface of the hood 21 and falls upon the outer surface of the wall 20 and descends by gravity and enters the trough 16 and passes back into the cylinder 5 and the cylinder 7 through the openings 17. The steam which is practically free of the extract passes through the space between the hood 21 and the wall 20 and edge of the trough 16 and escapes into the atmosphere around the edge of the hood 21.

Therefore, it will be seen that means are provided for returning the heavier particles of the coffee promptly to the body of coffee which is held in the percolator and also means are provided for separating the lighter particles of coffee or the coffee extract from the steam by a process of distillation and for permitting the steam to escape and for returning the particles of coffee extract back to the interior of the percolator.

Furthermore, the coffee cannot come in contact with the wall of the body 1 and consequently the coffee will not be scorched and the liquid coffee in its making will not be damaged from this cause.

Having described the invention, what is claimed is:

1. A percolator comprising a cylinder provided at its upper portion with openings, a trough surrounding the openings, an inverted funnel mounted upon the cylinder above the openings, and a convexed wall connecting the nipple of the funnel with the cylinder at a point within the trough.

2. A percolator comprising a cylinder provided with openings and having a trough surrounding the openings, an inverted funnel located above the openings, a convexed wall connecting the nipple of the funnel with the cylinder, and a convexed hood disposed over the convexed wall and the trough and having its inner surface spaced therefrom.

3. A percolator comprising a cylinder, a trough mounted at the upper portion of the cylinder, said cylinder having perforations which communicate with the interior of the trough, an inverted funnel located upon the cylinder above the openings and having its edge disposed below the upper edge of the trough, a convexed wall connecting the nipple of the funnel with the cylinder and having its edge disposed below the upper edge of the trough, a convexed hood disposed over the convexed wall and the trough and having its inner surface spaced from the trough and the convexed wall, the lower edge of the hood being disposed below the upper edge of the trough.

4. A percolator comprising inner and outer cylinders, a distilling means carried at the upper end of the upper cylinder, a column entering the lower cylinder, a dome carried by the column and having an upper convexed wall and a lower perforated wall and a perforated base for the column.

5. A percolator comprising a cylinder provided at its upper portion with openings, a distilling means mounted upon the cylinder and arranged to direct the products of distillation towards said openings, and a distillate collector located within the distilling means and surrounding the openings.

In testimony whereof, I have affixed my signature.

CHARLES B. PARKER.